Aug. 11, 1936.  F. N. MASON  2,050,620
ROD PACKING
Original Filed April 4, 1934
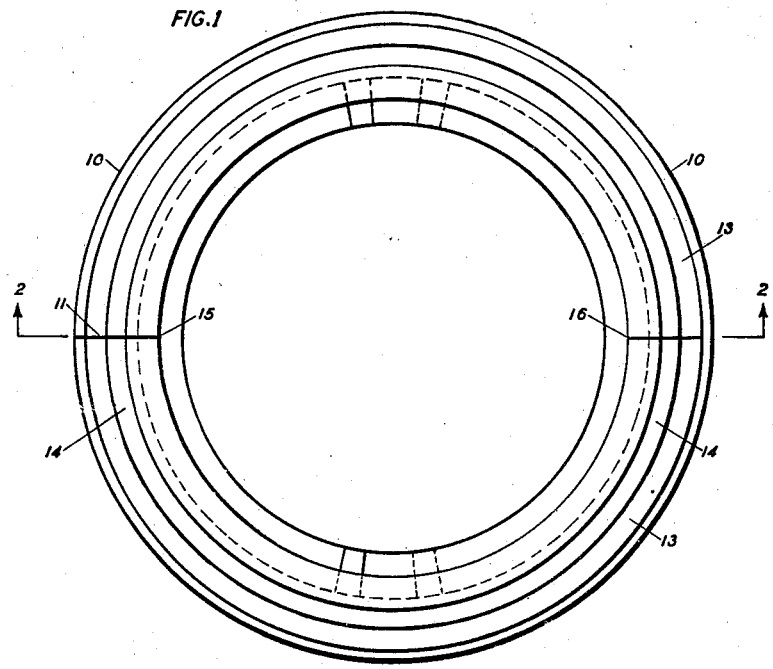
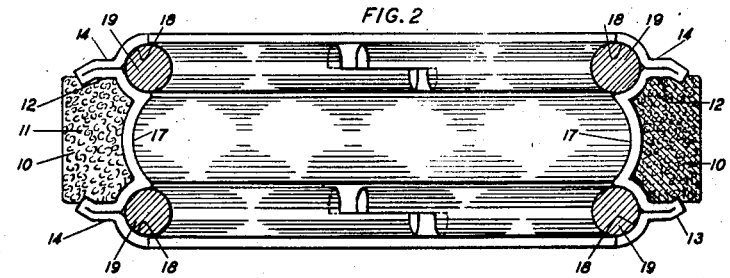
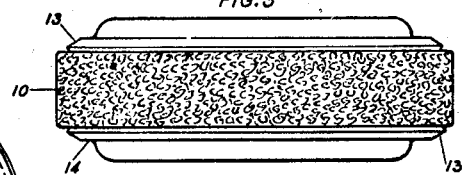
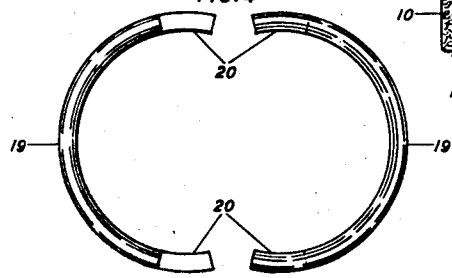
INVENTOR
Frank N. Mason,
by Edward A. Laurence,
his attorney.

Patented Aug. 11, 1936

2,050,620

UNITED STATES PATENT OFFICE 2,050,620

ROD PACKING

Frank N. Mason, South Brownsville, Pa.

Application April 4, 1934, Serial No. 718,916
Renewed January 21, 1936

10 Claims. (Cl. 288—3)

Generally speaking my present invention is an improvement in the type of packing illustrated in Letters Patent No. 1,656,880, issued to me on January 17, 1928.

In said Letters Patent one or more packing rings are used, the same consisting of a ring of graphited asbestos or compressible material having its inner portion seated in the outwardly facing channel of a metal ring whose inner perimetral wall is provided with annular ribs which are arranged to seat against the rod. The purpose is to compress the ring or rings laterally whereby to force the asbestos member outwardly into sealing engagement with the wall of the packing chamber and the ribs inwardly into sealing engagement with the rod.

In practice it has been found that, while such a packing is relatively efficient when new or only partially worn, after considerable wear it is found to be difficult or impossible to maintain sealing engagement with the wall of the packing chamber and with the surface of the rod. One reason for this partial failure is that it is difficult to manufacture such a channel ring with walls thin enough to provide the necessary flexibility to expand or compress the sealing parts into effective engagement.

Again in said Letters Patent the channel ring is cut at a plurality of points and the asbestos ring is cut at one point coincident with one of the cuts of the channel ring. Thus when in service the gaps have been compressed together to tighten the packing or to take up the wear, the limit of compressibility of the ring is reached as metal abuts metal.

My general purpose is to overcome these and other deficiencies in packing rings of this general type.

Generally speaking my improved packing presents inter alia the following novel and characteristic features.

The annular packing element such as the asbestos ring which is to be expanded into sealing contact with the wall of the packing chamber is seated in a metallic carrier ring of channel shape which is also provided with means for retaining in place independent, split, preferably parted rings which are compressed into sealing contact with the rod.

The carrier ring is preferably formed of sheet metal with outwardly converging flanges to maintain the asbestos packing in place and may be serrated to form a plurality of clamping tongues. The inner perimeter of the carrier ring is provided at either end with annular grooves in which are seated the bearing rings.

As a convenient form of carrier ring I may produce the channel flanges of a double thickness of the sheet metal material.

By forming the carrier ring of sheet metal, preferably copper, and employing independent split bearing rings, I obtain a much greater flexibility and compressibility in the channel ring, and thus under normal gland pressure the asbestos ring is expanded outwardly and inwardly into efficient sealing contact with the wall of the packing chamber and channel member, and the split rings are compressed into like contact with the rod.

By providing the split rings with overlapping ends with sufficient clearance to provide for additional compression to compensate for wear, the packing may be tightened indefinitely to take up wear and still remain efficient.

The carrier ring is preferably made in two semi-annular sections and the asbestos ring is parted on a line registering with one of the cuts in the carrier ring.

Other objects and also novel features of construction and arrangement of parts, will appear from the following description.

In the accompanying drawing, wherein I have illustrated a practical embodiment of the principles of my invention, Fig. 1 is an end view of the complete packing ring.

Fig. 2 is a sectional view of the same taken along the line 2—2 in Fig. 1.

Fig. 3 is a side elevation of the same on reduced scale.

Fig. 4 is an exploded view of one of the bearing rings.

Referring to the drawing, 10 represents what is commonly known as a packing element, preferably graphited asbestos formed in a ring, which is parted at one point, as at 11 in Figs. 1 and 2. The ring 10 is seated in the outwardly facing channel 12 of the metallic carrier ring 13, which is formed of two semi-annular sections, one of the partings of said sections coinciding with the parting 11 in the ring 10, so that when the rings are assembled the uncut portion of the ring 10 which bridges one of the partings in the ring 13 acts as a hinge to facilitate the assembly of the packing on the rod.

The flanges 14 form the side walls of the channel 12 and reinforce the grip of the flanges on the ring 10. The flanges 14 are preferably crimped inwardly to better grip the carrier ring 10.

The two partings of the ring 13 are indicated at 15 and 16, the former being coincident with the parting 11 of the ring 10 while the other parting 16 is bridged by the ring 10.

The web 17 which forms the intermediate portion of the bore of the ring 13 is outwardly bowed to add to the flexibility of the ring and also to clear the rod.

At either end of the bore the ring 13 is provided with arcuate annular grooves 18 in which are seated the metallic, preferably copper, bearing rings 19 which engage the rod. These rings 19 are parted and arranged to permit radial compression. Thus I prefer to form them of two or more parts with overlapping stepped ends as illustrated at 20, said stepped ends being provided with sufficient end clearances to permit the bearing rings to be radially compressed.

As a convenient method of producing the ring 13 of sheet metal, I form the flanges 14 and the grooves 18 by doubling the material, as shown in Fig. 2. This greatly facilitates the operation of manufacture and also greatly increases the flexibility of the channel ring.

Where, as illustrated in the said Letters Patent No. 1,656,880 the packing ring is assembled between the inner wall of the packing chamber and the rod and tapered surfaces are forced against the sides of the ring, compression is applied against either flange 14 of the ring 13 and also against the outer walls of the grooves 18, thus forcing the asbestos packing 10 outwardly against the wall of the packing chamber and web and also forcing the bearing rings 19 against the rod.

By tightening the follower of the gland this compression may be increased as required to take up wear and maintain the necessary seal.

The carrier ring 13 forms a housing for the sectional bearing rings 19. This housing member being preferably made in a plurality of parts, whose ends directly abut, prevents any significant change in the diameter of the formed ring. The packing ring 10 which is housed in the outer channel 12 of the ring 13 is arranged to engage the walls of the stuffing box to form a seal therewith. This packing ring 10 does not contact any of the moving parts of the machine and is only subjected to outwardly or radial movement against said walls when the axial compression of the carrier rings forces the compressible packing material outwardly. The carrier ring remains substantially at constant diameter but the grooves contract axially of the carrier ring and thus pinch the bearing rings inwardly against the rod, thereby compensating for the wear on the bearing rings and maintaining an efficient seal.

I claim:—

1. In a rod packing, the combination of a flexible metallic carrier ring provided with an outwardly facing annular channel and an interior annular groove, an annular packing element of compressible material mounted in said channel, and a parted bearing ring mounted in said groove, whereby when said carrier ring is compressed axially the packing element is expanded and the bearing ring is compressed inwardly, the carrier ring being at all times out of contact with the surfaces to be packed.

2. In a rod packing, the combination of a flexible metallic carrier ring provided with an outwardly facing annular channel and an interior annular groove, said carrier ring being parted transversely at a plurality of points, an annular packing element of compressible material seated in said channel and parted coincidently with one of the partings of the carrier ring so that the carrier ring may be expanded to assemble the packing in place, and a parted bearing ring seated in said groove, whereby when the carrier ring is compressed axially the packing element will be expanded and the bearing ring will be compressed inwardly, the carrier ring being at all times out of contact with the surfaces to be packed.

3. In a rod packing, the combination of a flexible metallic carrier ring provided with an outwardly facing annular channel and provided interiorly adjacent the ends of its bore with annular grooves, an annular packing element of compressible material seated in said channel, and parted bearing rings seated in said grooves, whereby when said carrier ring is compressed axially the packing element is expanded and the bearing rings are compressed inwardly, the carrier ring being at all times out of contact with the surfaces to be packed.

4. In a rod packing, the combination of a flexible metallic carrier ring provided with an outwardly facing annular channel and provided interiorly adjacent the ends of its bore with annular grooves, said carrier ring being parted transversely at a plurality of points, an annular packing element of compressible material seated in said channel and parted coincidently with one of the partings of the carrier ring so that the channel ring may be expanded to assemble the packing in place, and parted bearing rings seated in said grooves, whereby when the carrier ring is compressed axially the packing element is expanded and the bearing rings are compressed inwardly, the carrier ring being at all times out of contact with the surfaces to be packed.

5. In a rod packing, the combination of a flexible metallic carrier ring provided with an outwardly facing annular channel and provided interiorly adjacent the ends of its bore with annular grooves, an annular packing element of compressible material seated in said channel, and bearing rings, each comprising a plurality of arcuate sections with overlapping ends, seated in said grooves, whereby when the carrier ring is compressed axially, the packing element is expanded and the bearing rings are compressed inwardly, the carrier ring being at all times out of contact with the surfaces to be packed.

6. In a rod packing, the combination of a flexible metallic carrier ring provided with an outwardly facing annular channel and provided interiorly adjacent the ends of its bore with annular grooves, said carrier ring being parted transversely at a plurality of points, an annular packing element of compressible material seated in said channel and parted coincidently with one of the partings of the carrier ring so that the channel ring may be expanded to assemble the packing in place, and bearing rings, each comprising a plurality of arcuate sections with overlapping ends, seated in said grooves, whereby when the carrier ring is compressed axially, the packing element is expanded and the bearing rings are compressed inwardly, the carrier ring being at all times out of contact with the surfaces to be packed.

7. In a rod packing for use in a packing chamber, the combination of a metal carrier ring compressible axially thereof, the bore of said carrier ring being provided with an annular groove and the exterior peripheral portion of the ring being provided with a circumferential channel, a partible metal bearing ring compressible radially and partially received in said groove and arranged to circumferentially engage the rod, and an annular packing member partially received in said channel and arranged to engage the wall of the chamber, whereby when the carrier ring is compressed axially the bearing ring is compressed on the rod and the packing is expanded against the wall of the chamber.

8. In a rod packing for use in a packing chamber, the combination of a metal carrier ring compressible axially thereof but of substantially constant diameter, the bore of said carrier ring being provided with an annular groove and the exterior perimetral portion of the ring being provided with a circumferential channel, a partible metal bearing ring compressible radially and partially received in said groove and arranged to circumferentially engage the rod, and an annular packing member partially received in said channel and arranged to engage the wall of the chamber, whereby when the carrier ring is compressed axially the bearing rings is compressed on the rod and the packing is expanded against the wall of the chamber.

9. In a rod packing for use in a packing chamber, the combination of a metal carrier ring compressible axially thereof, the bore of said carrier ring being provided with an annular groove and the exterior perimetral portion of the ring being provided with a circumferential channel, a metal bearing ring formed of a plurality of parts having stepped ends with clearance between the ends, said bearing ring being partially received in the groove and being arranged to circumferentially engage the rod, and an annular packing member partially received in said channel and arranged to engage the wall of the chamber, whereby when the carrier ring is compressed axially the bearing ring is compressed on the rod and the packing is expanded against the wall of the chamber.

10. In a packing, the combination of a carrier ring provided with an annular groove, a partible bearing ring compressible radially and partially received in said groove, whereby when said carrier ring is compressed axially the bearing is moved transversely into engagement with the surface to be packed, said carrier ring being at all times out of contact with said surface.

FRANK N. MASON.